(12) United States Patent
Duvall (10) Patent No.: US 10,349,774 B2
(45) Date of Patent: Jul. 16, 2019

(54) DEVICE AND SYSTEM FOR CREATING INFUSED BEVERAGES

(71) Applicant: Gideon Duvall, Boca Raton, FL (US)

(72) Inventor: Gideon Duvall, Boca Raton, FL (US)

(*) Notice: Subject to any disclaimer, the term of this patent is extended or adjusted under 35 U.S.C. 154(b) by 217 days.

(21) Appl. No.: 15/373,403

(22) Filed: Dec. 8, 2016

(65) Prior Publication Data

US 2018/0160844 A1    Jun. 14, 2018

(51) Int. Cl.
*A47J 31/24* (2006.01)
*A47J 31/34* (2006.01)
*A47J 31/36* (2006.01)
*A47J 31/56* (2006.01)
*A47J 31/52* (2006.01)

(52) U.S. Cl.
CPC ........... *A47J 31/56* (2013.01); *A47J 31/3671* (2013.01); *A47J 31/52* (2013.01)

(58) Field of Classification Search
CPC .. A47J 31/24; A47J 31/36; A47J 31/34; A47J 31/30; A47J 31/545; A47J 31/52
See application file for complete search history.

(56) References Cited

U.S. PATENT DOCUMENTS

| | | | | |
|---|---|---|---|---|
| 6,845,704 | B2 * | 1/2005 | Lassota | A47J 31/402 99/280 |
| 2011/0094389 | A1 * | 4/2011 | Coccia | A47J 31/36 99/280 |
| 2013/0108754 | A1 * | 5/2013 | Blanc | A47J 31/3623 426/431 |
| 2014/0338541 | A1 * | 11/2014 | Jaccard | A47J 31/00 99/283 |

* cited by examiner

*Primary Examiner* — Michael Laflame, Jr.
(74) *Attorney, Agent, or Firm* — Mark C. Johnson (57) ABSTRACT

A system for creating infused beverages that includes a solvent flow management system having a pump housed in a pump body and operably coupled to a pump drive system operably configured to drive the pump to induce a flow of solvent, housed by the pump, through a solute housed in a brewing chamber to generate an infused solution. The system also includes a heating element disposed within the pump body, outside of fluid contact with the solvent, and is operably configured to activate and thermally couple with the solvent housed by the pump through conduction within a material of the pump body. An electronic control system is also provided that is operably configured to activate the pump drive system and to activate the heating element.

20 Claims, 10 Drawing Sheets

DEVICE AND SYSTEM FOR CREATING INFUSED BEVERAGES

CROSS-REFERENCE TO RELATED APPLICATION

This application claims priority to U.S. Provisional Patent Application No. 62/009,606, filed on Jun. 9, 2014, and PCT/US2015/034989 the entirety of which is incorporated by reference.

FIELD OF THE INVENTION

The present invention relates to infusion beverage systems that utilize pressure, temperature, and flow of a solvent through a solute.

BACKGROUND OF THE INVENTION

The creation of brewed or infused beverages through the infusion of a solvent with a solute contained within a filter media has been performed for millenniums. Over time it has come to be understood that the control of brewing variables such as infusion temperature, pressure, and flow rate of solvent through solute change the resulting beverages' chemical composition and taste.

Thus, many brewing systems have been developed that seek to enable flavor modification through selective control of one or more infusion variables. However, few brewing systems facilitate dynamic control of one or more of these variables during an infusion. Of those that do, modifications of one or more variables during an infusion result in changes to other brew variables. This lack of independent variable control makes the optimization, modification and consistent duplication of infused beverages difficult.

For instance, currently available brewing systems that enable users to modify pressure during an infusion rely on back pressure generated in a brewing chamber by a resistive media typically composed of a filter and solute. In one configuration, brew chamber pressure modification is achieved by modulating the resistance of said resistive solute media while holding pumping energy constant. While this does result in a change in infusion pressure, it also changes the infusion flow rate. In another conventionally available system, the user modifies infusion pressure through the variation of solvent pumping force while keeping the resistance of the resistive media constant. This too results in an increase in infusion pressure and simultaneous change in infusion flow rate. Thus, in conventional systems, any attempt to control extraction pressure results in a variation of flow rate during the infusion process. While both flow rate and pressure are known to effect the flavor of a brewed infusion, the magnitude of flow rate variations is known to have a greater effect. Thus, there is an apparent need for a brewing system that affords independent modulation of flow rate independent of infusion pressure. Furthermore, due to the fact that pressure is known to effect the flavor of an infusion, there is a need for a beverage brewing system that is capable of modifying infusion pressure independent of flow rate enabling the user to optimize infused solution chemical composition and produce consistent beverages.

It is well understood that infusion temperature also affects chemical composition of an infused beverage solution. Thus, an operator may find it advantageous to have precise control of brewing/infusion temperature during the brewing process to optimize flavor. The vast majority of beverage brewing systems utilize a constant volume solvent supply system whereby solvent is dispensed from a boiler by pumping solution into the boiler. Any temperature differential between the dispensed solution and the solution replacing the dispensed solution in the boiler makes it theoretically impossible to dispense solution with a consistent temperature and the larger the volume. Further, the faster the rate dispensed, the greater the temperature variation. Therefore, a beverage brewing system that affords precise, accurate and consistent temperature solution for the full production of the brewed beverage independent of beverage size and infusion rate would enable optimization of beverage flavor and consistency is thus needed.

Many known beverage brewing assemblies do not provide the user the ability control the fluid flow rate in a precise, effective, and efficient manner. Furthermore, no known beverage brewing assembly affords the user the ability to select and achieve a predetermined infusion duration and dispensed volume. Moreover, many, if not all, known beverage brewing systems do not provide a solvent pumping assembly that also incorporates a heating element that effectively transmits generated heat to the solvent housed by the solvent pumping assembly.

SUMMARY OF THE INVENTION

The present invention relates to a system of brewing beverages that satisfies the outlined need, thereby facilitating a precise and effective brewing process in accordance with a dictated brewing condition parameters. The system and device may be composed of a Solvent Flow Management System ("SFMS"), a Solvent Temperature Management System ("STMS"), and a Solution Pressure Management System ("SPMS"), as further described below.

Although the invention is illustrated and described herein as embodied in a system and method for brewing beverages, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

With the foregoing and other objects in view, there is provided, in accordance with the invention a system for creating infused beverages that includes a SFMS having a pump housed in a pump body and is operably coupled to a pump drive system that is operably configured to drive the pump to induce a flow of a solvent, that is housed by the pump, through a solute housed in a brewing chamber. When the solvent is forced through the solute an infused solution is generated. The brewing chamber and the pump are fluidly coupled through a solvent-flow conduit. The system also may include a STMS having a heating element disposed within the pump body and outside of fluid contact with the solvent, the heating element operably configured to activate and thermally couple with the solvent housed by the pump through conduction within a material of the pump body. "Thermally couple" is defined as the exchange of measurable heat to an object directly or indirectly. Further, the system may include an electronic control system communicatively coupled to the SFMS and the STMS, wherein the electronic control system is operably configured to activate the pump drive system and to activate the heating element.

In accordance with an additional feature of the present invention, the pump is of a piston-driven pump assembly that includes the pump body having a pump bore defining a pump interior volume. Further, the pump interior volume has a piston disposed therein and that is in a fluidically sealed configuration with the pump bore.

In accordance with another feature, an embodiment of the present invention includes the pump drive system having a motor operably coupled to, i.e., directly or indirectly attached to move or activate when in operation, the piston and that is communicatively coupled to the electronic control system, wherein the electronic control system is operably configured to modulate the motor in defined increments.

In accordance with yet another feature, an embodiment of the present invention includes the solvent-flow conduit including, but not limited to: (1) a pump-valve conduit spanning from the pump interior volume to an outflow valve upstream of the brewing chamber and (2) a valve-brew chamber conduit spanning from the outflow valve to the brewing chamber, wherein the outflow valve operably configured to control the flow of solvent into the brewing chamber.

In accordance with additional features of the present invention, the outflow valve is either of a one-way check valve or may be of a selective-flow valve that is communicatively coupled to the electronic control system and/or operably configured to selectively control a directional flow of the solvent. In other embodiments, the outflow valve is of a sliding check valve.

In accordance with yet another feature, an embodiment of the present invention includes a brew chamber-vent conduit, independent of the solvent-flow conduit, spanning from and in fluid communication with the brewing chamber and includes a vent valve disposed in the brew chamber-vent conduit and operably configured to place the brewing chamber in fluid communication with an outside ambient environment. The vent valve may include an open and closed position to dictate the flow of fluid.

In accordance with a further feature of the present invention, the electronic control system is operably configured to dynamically activate either the pump drive system or the heating element based on a solvent property sensed by either a temperature sensor and a pressure sensor disposed somewhere in the system and in fluid communication with the solvent flow or infused solution.

In accordance with another feature, an embodiment of the present invention includes a SPMS having a flow regulator downstream of the brewing chamber, wherein the flow regulator is operably configured to selectively modify an infusion process pressure greater than a pressure created upstream in the brewing chamber caused by a flow of the solvent through the solute.

Also in accordance with the present invention, a device for infusing beverages is disclosed that includes a SFMS with (i) a pump body with a pump bore defining a pump interior volume, (ii) a piston disposed within the pump interior volume and that is in a fluidically sealed configuration with the pump bore, and (iii) a pump drive system operably configured to translate the piston from a first position to a second position along a piston translation path. The second position of the piston results in a reduced volumetric capacity of the pump interior volume than a volumetric capacity of the pump interior volume when the piston is in the first position. The device also includes a pump-valve conduit downstream of the pump interior volume and in fluid communication with a brewing chamber for housing a solute. Further, the device includes an electronic control system communicatively coupled to the SFMS and is operably configured to translate the piston to the second position along the piston translation path to induce a flow of solvent through the solute to generate an infused solution. Lastly, the device may include an outlet downstream of the brewing chamber for discharging the infused solution. The electronic control system may also be operable to beneficially provide timing and optimization to the fluid parameters in the brewing process.

In accordance with another feature, an embodiment of the present invention includes an inflow valve operably configured to introduce a solvent within the pump interior volume and an outflow valve disposed in a conduit separating the brewing chamber and the pump interior volume, wherein the outflow valve operably configured to control the flow of solvent into the brewing chamber.

In accordance with an additional feature, an embodiment of the present invention includes a STMS having a heating element disposed within the pump body to increase the temperature of the solvent housed in the pump interior volume.

In accordance with a further feature of the present invention, the pump body is of a material with a high thermal conductivity, i.e., , i.e., approximately 320–20 (W/m·K).

In accordance with yet another feature, an embodiment of the present invention also includes the pump body having a plurality of pump bores each defining a pump interior volume with a piston disposed therein that are in a fluidically sealed configuration with the pump bore. The plurality of pump bores are in a flanking relationship with the heating element to effectively transfer heat thereto.

In accordance with another feature, an embodiment of the present invention also includes a temperature sensor disposed within the pump interior volume and operably configured to receive a temperature of the solvent housed therein. Further, the electronic control system is communicatively coupled to the temperature sensor and may be operably configured to activate the heating element based on the temperature of the solvent housed in the pump interior volume.

In accordance with an additional feature, an embodiment of the present invention includes the SFMS having a thermal isolation plate separating the pump body and the pump drive system, wherein the thermal isolation plate is of a thermally insulating material different than a material of both the pump body and the pump drive system to which the thermal isolation plate couples.

Another embodiment of the invention includes a system for creating infused beverages with (1) a SFMS having a pump body with a pump bore defining a pump interior volume with a piston disposed therein that is operably coupled to a pump drive system operably configured to translate the piston to induce a flow of solvent through a solute housed in a brewing chamber to generate an infused solution, wherein the brewing chamber and the pump interior volume fluidly coupled through a solvent-flow conduit. The system also includes (2) a STMS with a heating element disposed within the pump body, wherein the heating element operably configured to activate and thermally couple with the solvent housed in the pump interior volume. Further, the system includes (3) an electronic control system communicatively coupled to the SFMS and the STMS, wherein the electronic control system operably configured to activate the pump drive system and to activate the heating element.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The word "system," as used herein, is defined as one or more devices or components that form a network for performing or distributing something or operating for a common purpose. The word "correspond" or its equivalent is defined as being similar or equivalent in character, quantity, origin, structure or function As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Although the invention is illustrated and described herein with reference to specific embodiments, the invention is not intended to be limited to the details shown. Rather, various modifications may be made in the details within the scope and range of equivalents without departing from the invention.

Figure 1:
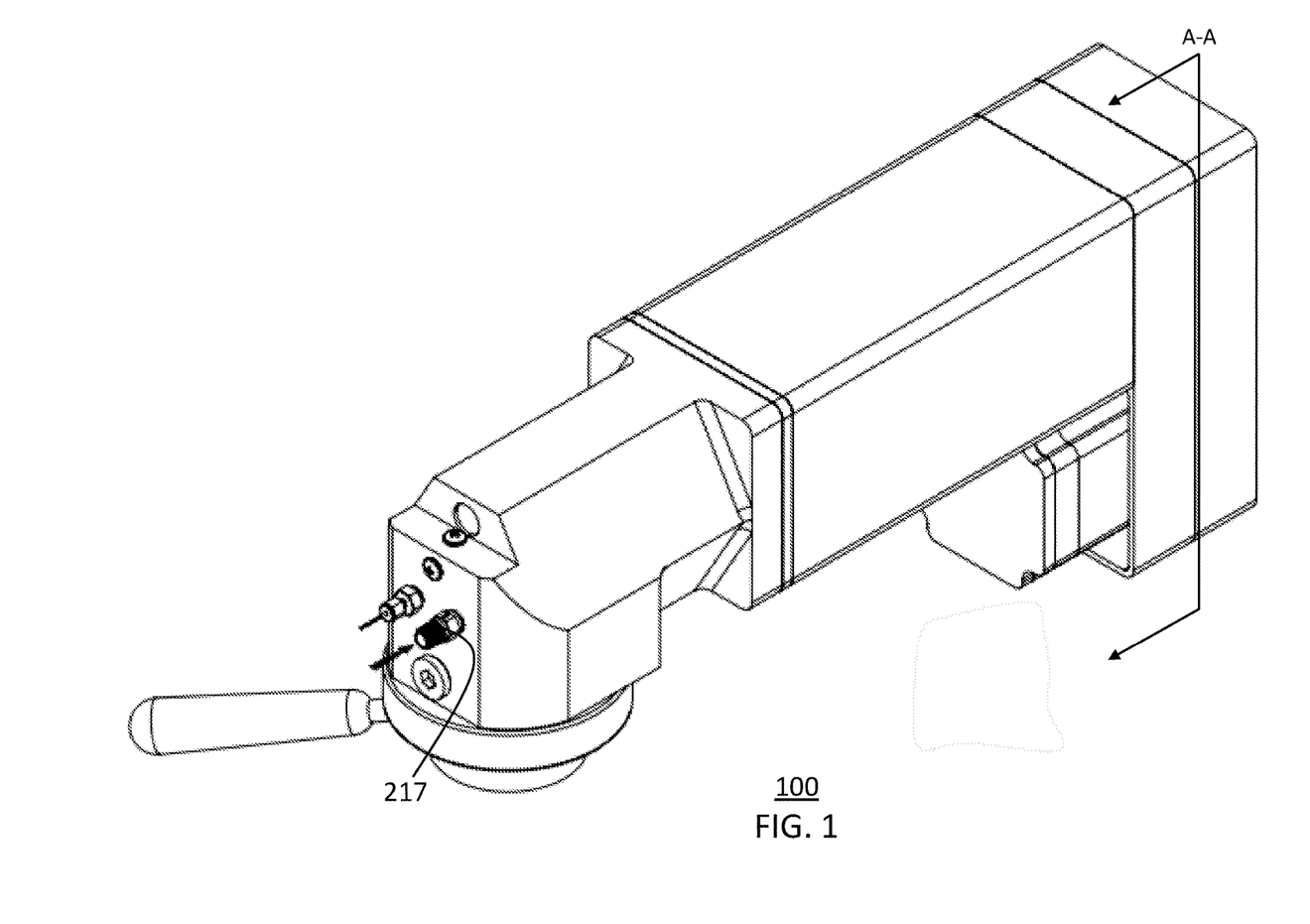
FIG. 1 is a perspective view of a beverage brewing device in accordance with an embodiment of the present invention.
Figure 2:
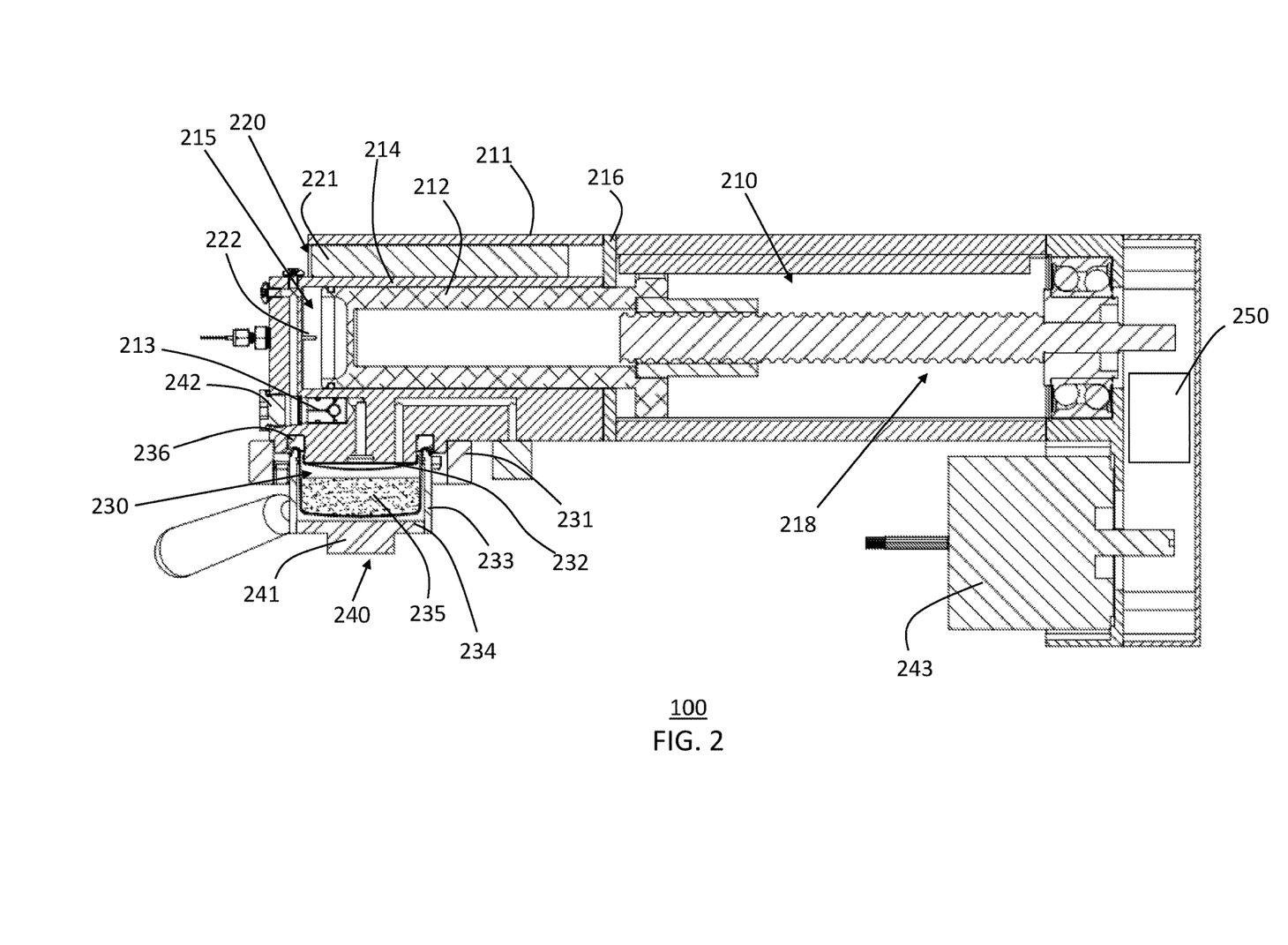
FIG. 2 is a cross-sectional view of the beverage brewing device of FIG. 1 along section A-A.

With reference to FIG. 1, a perspective view of an exemplary brewing system 100 is shown. FIG. 2 depicts a cross-sectional view of the brewing system 100 shown in FIG. 1. Referring to FIGS. 1 and 2, the brewing system 100 includes a SFMS 210, a STMS 220, a brew chamber 230, SPMS 240, and control system 250.

SFMS

Referring to both FIG. 1 and FIG. 2, SFMS 210 is composed of a pump body 211 and a pump drive system 218. The pump body 211 contains a pump piston 212 which forms a fluidic seal (i.e., restricting the flow of liquid) with a pump bore 214 forming a pump interior volume 215. The pump body 211 also includes inflow valve 217 and the outflow valve 213 which are configured to control the flow of fluid into and out of SFMS 210, more specifically into the brewing chamber 230. Movement of the pump piston 212 is controlled by pump drive system 218 which, in the embodiment shown in FIG. 2, is depicted as a motor driven ball screw linear actuator controlled by the control system 250. The pump body 211 and the pump drive system 218 are preferably directly coupled together and thermally isolated by a thermal isolation plate 216 which may also act as a guide bushing for the pump piston 212.

The pump drive system 218 may alternately be composed of a multitude of operable equivalent mechanisms, including but not limited to linear motors, hydraulic or pneumatic pistons, mechanical levers or the like. Regardless the methodology utilized, the pump drive system 218 is capable of providing sufficient force to ensure the desired flow rate of solute is achieved during the infusion process independent of fluid pressure. Further, the pump drive system 218 also affords the user control of pump piston 212 movement, whereby the user is afforded precise accurate control over total dispensed volume, dispensing time and dispensed fluid flow rate.

Figure 4:
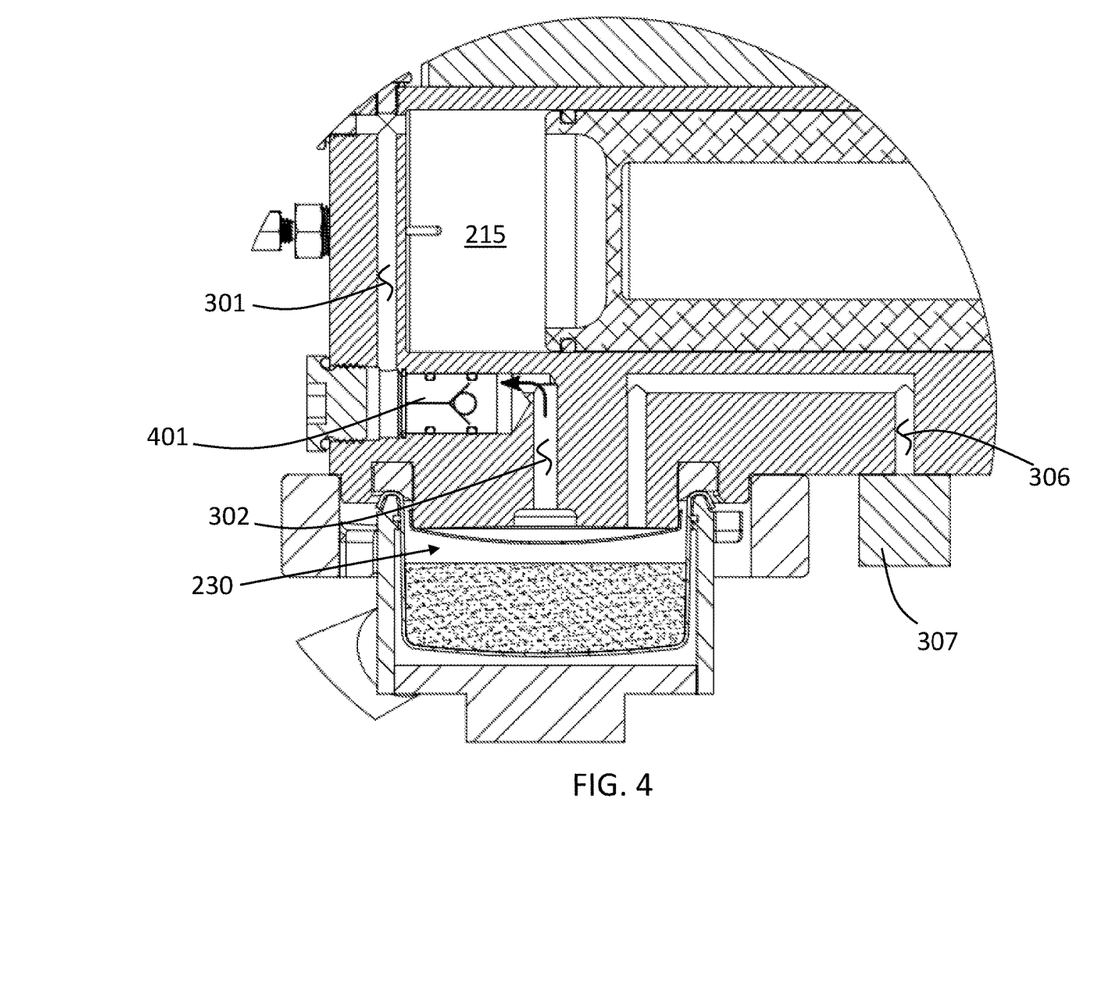
FIG. 4 is a sectional view of the beverage brewing device of FIG. 1 in an alternate mode of operation.

The pump drive system 218 is operably configured to translate the piston 212 from a first position (as shown in FIG. 4) to a second position along a piston translation path (as shown in FIG. 2). As shown in the compared FIGS. 2 and 4, the second position of the piston 212 results in a reduced volumetric capacity of the pump interior volume 215 than a volumetric capacity of the pump interior volume 215 when the piston is in the first position. The movement of the piston 212 to the second position also results in a solvent displacement volume that is substantially equal, i.e., within at least 0.5 fl oz, to the desired dispensed solvent volume through a single translation of the piston 212 along the piston translation path into the second position. This advantageously permits the solvent to be stored in the internal volume 215 before the brewing cycle initiates, i.e., when the solvent flow is induced and an infused beverage is generated, to be heated by the heating element 221. In one beneficial embodiment, no solvent is introduced into the pump interior volume 215, whether through the inflow valve 217 or not, after initiating the brewing cycle to maximize energy efficiency of the system when compared to known brewing systems. Additionally, the electronic control system may also be operably configured to initiate the brewing cycle that generates the infused solution of the infused solution volume without any solvent introduced into the pump interior 215 after initiating of the brewing cycle.

The electronic control system 250 is advantageously communicatively coupled to the solvent flow management system in order to control the piston pump 212. The electronic control system 250 is also operably configured to translate the piston 212 to the second position along the piston translation path to induce a flow of solvent through the solute to generate the infused solution. Using a piston pumping configuration enables precise control and optimization of the flow rate not accomplished with known brewing systems. The control and optimization accomplished the with this piston pumping configuration is only exacerbated with the use of a motor, e.g., a stepper or servo motor 243, that is operably coupled to the piston 212 and communicatively coupled to the electronic control system 250. As such, the electronic control system 250 is operably configured to modulate the motor 243 in defined increments to precisely dictate the fluid flow rate.

In one embodiment, SFMS 210 may be configured as a single flow direction piston pump whereby the pump is capable of dispensing the required solvent to brew a beverage without introduction of additional solution into brewing system 100. In this configuration, the inflow valve 217 and outflow valve 213 operate as one way check valves whereby solvent, e.g., water, moves through the inflow valve 217 and into SFMS 210 during the pump priming stroke. Once the pump has been primed, or filled with solvent, STMS 220 thermally modulates the solvent to the desired temperature controlled by the control system 250. Once the solvent has been thermally modulated, it is pumped to the brew chamber in accordance with the user's desired solvent properties, e.g., temperature and flow rate.

Figure 3:
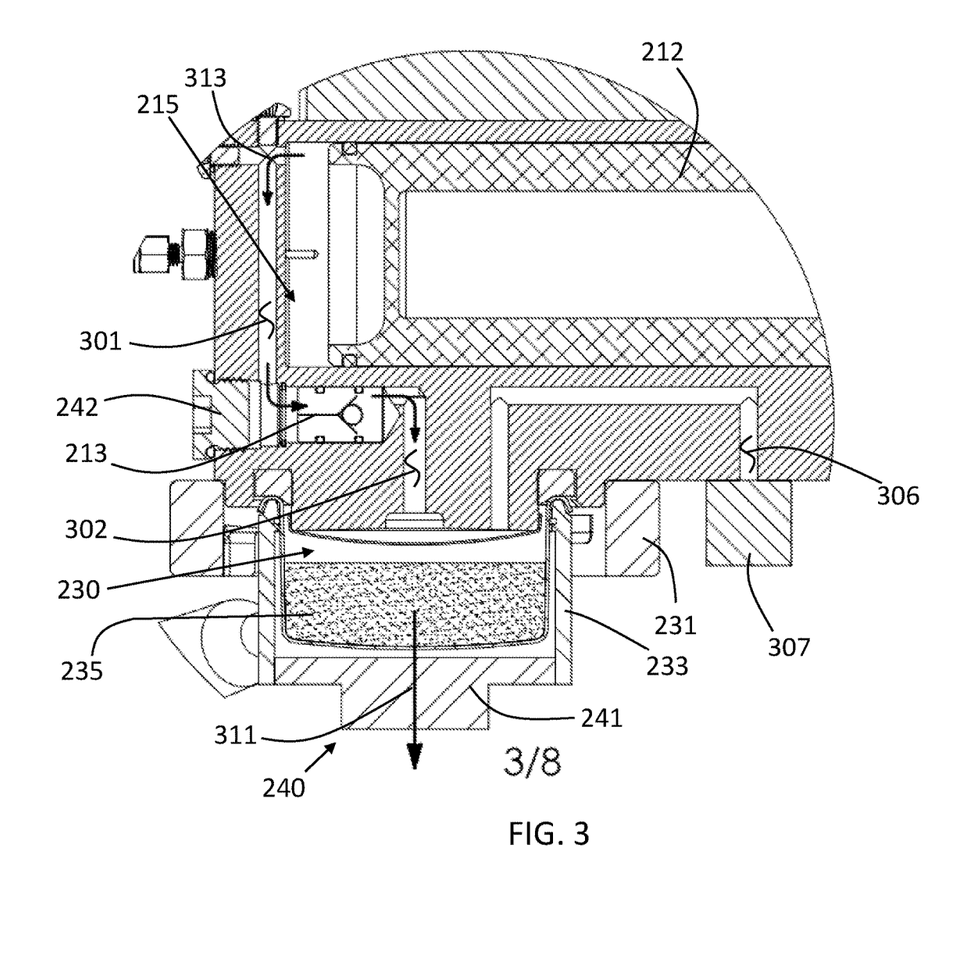
FIG. 3 is a sectional view of the beverage brewing device of FIG. 1 in a mode of operation.

To illustrate the aforementioned solvent pumping process in connection with the solute, FIGS. 3-8 depict various stages of the solvent in the pumping and/or depressurization process. Specifically, FIG. 3 depicts the pumping stroke of the piston 212 with a decreased interior volume 215 that effectuates pressure exerted on the solvent through pump-valve conduit 301 through the outflow valve 213 at a volumetric flow rate controlled by control system 250. The solvent, represented by arrow 314 then flows through the valve-brew chamber conduit 302 to the brew chamber 230 where the infusion with solute occurs, thereby creating an infused solution (represented with numeral 311) that passes through a flow regulator 241 of the SPMS 240 before exiting brewing system 100. In one embodiment, when the infused solution 311 is discharged from the assembly 100, an infusion vent valve 307 is in a closed state. In other embodiments, the infusion vent valve 307 may be in an open state when the infused solution 311 is discharged.

Both the pump-valve conduit 301 and the valve-brew chamber conduit 302 can be said to form part of the solvent-flow conduit that fluidly couples the pump volume 215 with the brewing chamber 230. Other conduits may also form part of the solvent-flow conduit. The pump-valve conduit 301 can be seen spanning from the pump interior volume 215 to an outflow valve 213 upstream of the brewing chamber 230. The valve-brew chamber conduit 302 can be seen spanning from the outflow valve 213 to the brewing chamber 230 and the outflow valve 213 is beneficially operably configured to control the flow of solvent into the brewing chamber 230.

The SFMS 210 is preferably configured whereby it is capable of providing a precise and accurate flow rate during the infusion in accordance with the user's requirements and regardless the back pressure generated within brew chamber 230. In one embodiment, the SFMS 210 is operably configured to provide a dynamically variable flow rate, i.e., varied while the system has initiated a brewing cycle or before the system 100 has initiated a brewing cycle. Benefits of the present invention, however, can still be realized if the SFMS 210 is only capable of providing a constant flow rate. This benefit will found in that the SFMS 210 may still be configured such that the pump interior volume 215 may be set to be of a sufficient size whereby several classifications of beverages, requiring varying dispensed volume, may be produced by the beverage brewing system 100, e.g., espresso (1-4 fl oz) and brewed coffee (4-20 fl oz).

The brewing system 100 is also operably configured to provide depressurization of the brew chamber 230 post infusion of the solute with the solvent. One position during this depressurization process is depicted in FIG. 4. The brew chamber 230 depressurization is facilitated by a dual state outflow valve 401 that may be configured to operate as a sliding check valve biased to only permit flow from the pump to the brew chamber 230. In this manner, the shifting occurs as a result of a changing pressure differential and results in a change of the volume of valve-brew chamber conduit 302. In use, the process of creating an infused solution causes a higher positive pressure within pump-valve conduit 301 than in valve-brew chamber conduit 302. This pressure differential causes dual state outflow valve 401 to enter into a state whereby the volume of the valve-brew chamber conduit 302 is at minimum volume. Upon completion of an infusion, the SFMS 210 may enter into a priming state whereby pump piston 212 is retracted. When the pump piston 212 is retracted, as depicted in FIG. 4, an increased pump volume 215 decreases the pressure within the pump-valve conduit 301, whereby the pressure in the conduit 301 may be lower than that within valve-brew chamber conduit 302.

When the pressure differential switches, the dual state outflow valve 401 enters into an alternate state whereby the valve-brew chamber conduit 302 is an increased volume by the dual state outflow valve 401 changing its position in its housing, whereby its internal pressure and that of brew chamber 230 may decrease. Preferably said volume increase is sufficient to cause the brew chamber 230 pressure to equate with that of the ambient atmosphere enabling the safe removal and replacement of solute within brew chamber 230. One embodiment of the aforementioned configuration is capable of depressurizing brew chamber 230 without use of vent valve 307, which may remain closed or, alternatively, the brew chamber-vent conduit 306 and vent valve 307 may be omitted in their entirety to decrease device complexity and/or cost.

Figure 5:
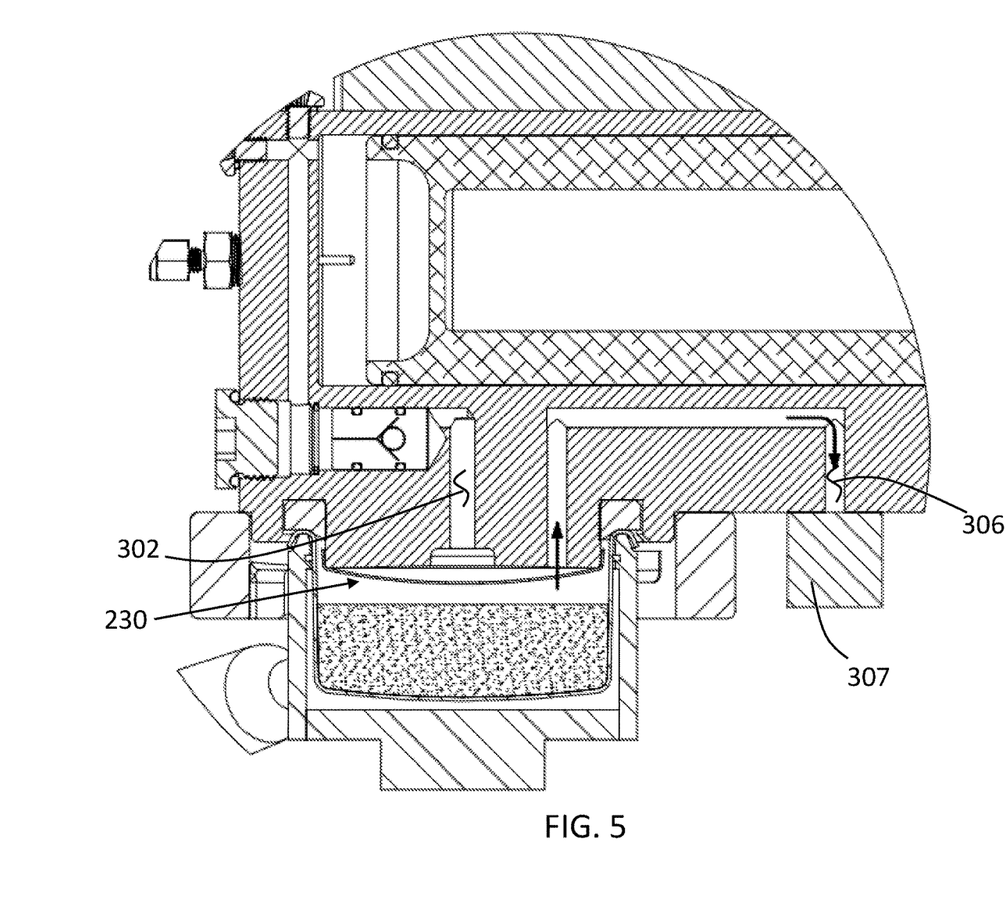
FIG. 5 is a sectional view of the beverage brewing device of FIG. 1 in an alternate mode of operation.

FIG. 5 depicts an alternate methodology for depressurizing brew chamber 230. In the depicted embodiment a pressure differential exists between brew chamber 230 and the volume within the in brew chamber-vent conduit 306 upstream of the vent valve 307. Said pressure differential is mitigated by opening the vent valve 307, thereby enabling fluid flow between brew chamber 230 and vent valve 307 through brew chamber-vent conduit 306. Operation of vent valve 307 may be controlled by control system 250 or manually by a user.

Figure 6:
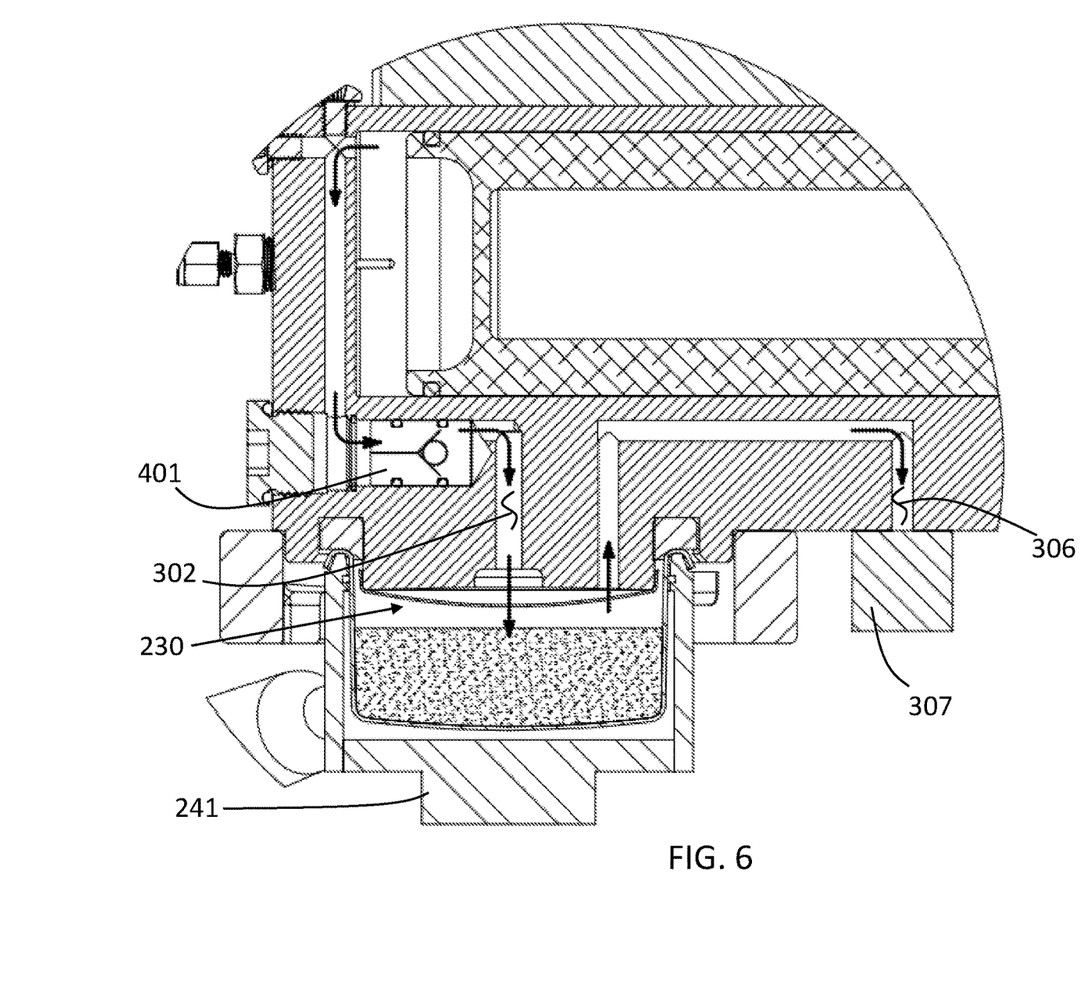
FIG. 6 is a sectional view of the beverage brewing device of FIG. 1 in an alternate mode of operation.

FIG. 6 depicts one embodiment of the present invention wherein one mode/configuration of the device 100 includes the brew chamber 230 filling with solvent without dispensing any infused beverage. In this embodiment, the flow regulator 241 is in a closed position preventing fluid flow and vent valve 307 is open. Fluid is then pumped from SFMS 210 into the brew chamber 230 where said fluid and any other fluid already in brew chamber 230, such as ambient air, may exit the brew chamber 230 through vent valve 307. This manner, the device 100 beneficially enables the user to fill the brew chamber 230 with solvent without a pressure increase. The volume of solvent dispensed and operation of vent valve 307 may also be selectively controlled by control system 250.

Figure 7:
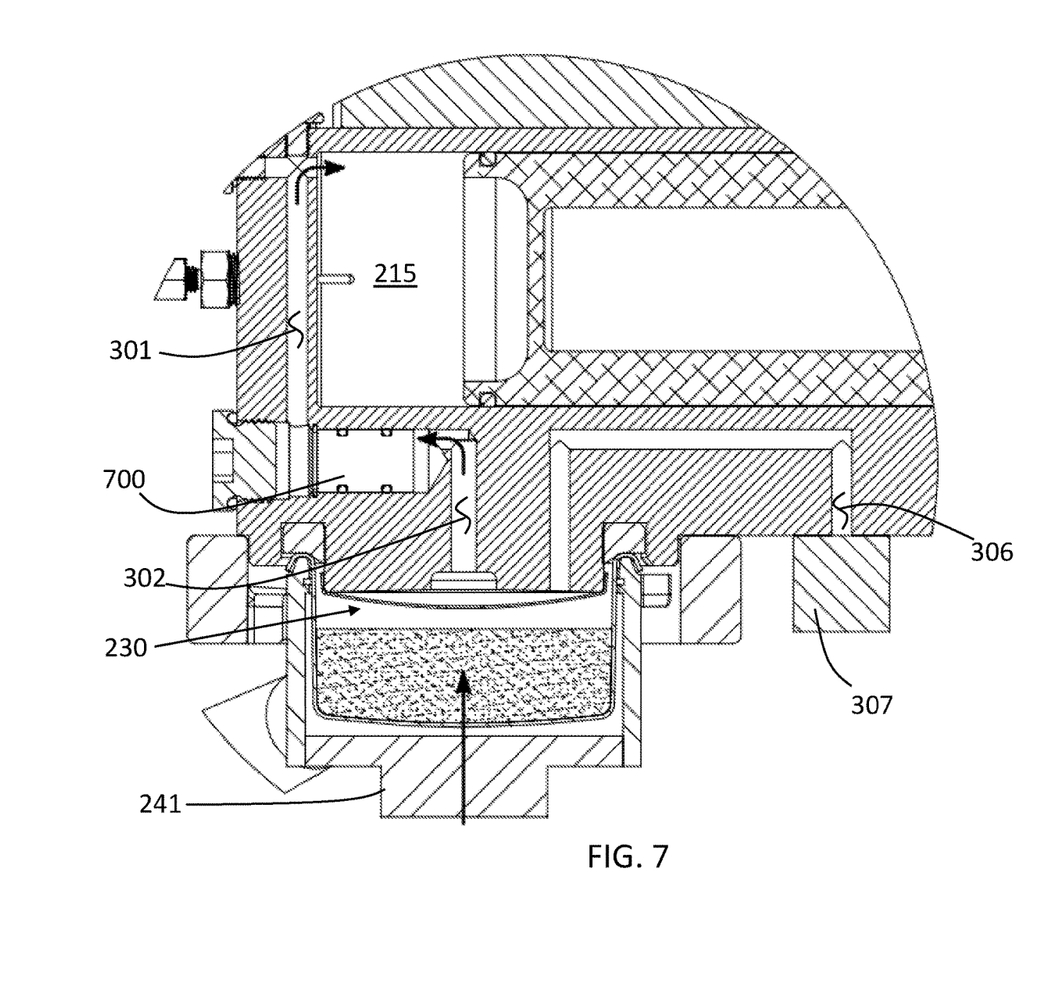
FIG. 7 is a sectional view of the beverage brewing device of FIG. 1 in an alternate mode of operation.

In an alternate embodiment, depending on the user's requirements, it may be found advantageous to draw fluid in a reverse direction into the brew chamber 230 or into the SFMS 210 as depicted in FIG. 7. In the depicted embodiment, inflow valve 217, depicted in FIG. 1, is closed and outflow valve 213, depicted in FIG. 2, is replaced with selective outflow valve 700 that is selectively opened and closed to control the flow of fluid in both directions. In the mode of operation depicted in FIG. 7, the vent valve 307 is in a closed state and the flow control valve 241 is in an open state whereby fluid may flow into brew chamber 230 and into an increasing pump interior volume 215. The aforementioned flow of fluid may occur as a result of positive fluid pressure from a fluid pumping source or negative pressure generated by increasing pump volume 402. Alternately, a user may desire to generate a vacuum within the brew chamber 230, which may be accomplished by operating the device as previously described in FIG. 7 and closing flow control valve 241.

Figure 8:
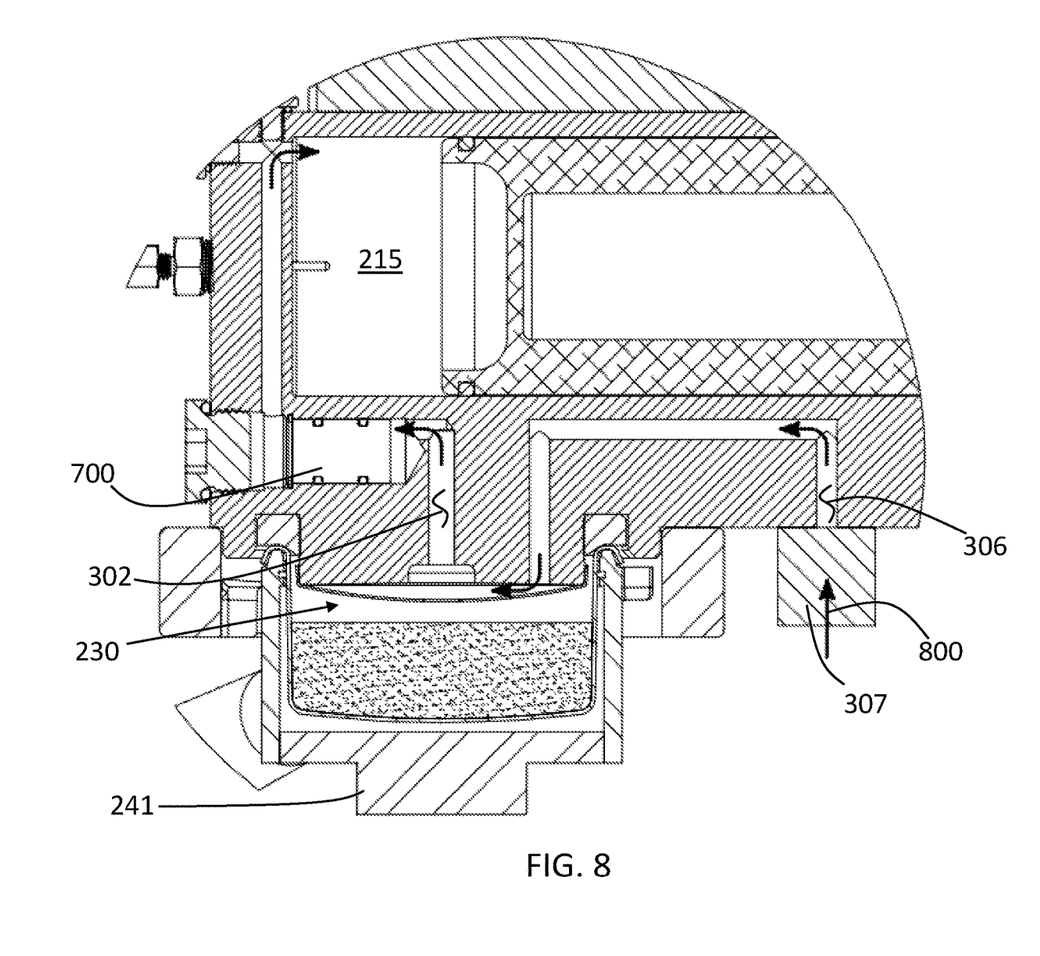
FIG. 8 is a sectional view of the beverage brewing device of FIG. 1 in an alternate mode of operation.

FIG. 8 depicts an alternate mode/configuration of the SFMS 210 operation wherein an ambient fluid, represented with an arrow 800, is drawn into SFMS 210 through the vent valve 307. In this mode of operation, the flow control valve 241 is in a closed state, the selective outflow valve 700 is in an open state, and the vent valve 307 is in an open state such that fluid may flow from an external source fluidly coupled to the vent valve 307 into the volume 215 through conduits as depicted in FIG. 8. In an alternate embodiment of the SFMS 210, not depicted, the inflow valve 217, depicted in FIG. 1, may be selectively supplied with more than one fluid, whereby the SFMS 210 may supply brew chamber 230 with more than one fluid.

STMS

With reference back to FIG. 2, the STMS 220 consists of a heating element 221, thermally coupled, i.e., capable of transferring a measurable amount of heat, to the pump body 211 and pump bore 214. In said manner, the heating element 221 transfers heat through conduction through the pump bore 214 to the fluid within the volume 215. The device 100 also includes a temperature sensor 222 disposed within the volume 215 and is operably configured, i.e., when the system is in use, to sense the temperature of fluid within pump interior volume 215. The temperature sensor 222 may also be communicatively coupled to the control system 250 to provide optimum and/or user-selected brewing conditions.

In the preferred embodiment, the solvent contained within pump body 211 is brought to and held at a temperature prior to initiating the infusion process. However, STMS 220 may also be configured to change the solvent temperature during an infusion, i.e., "dynamically." It may be found advantageous to thermally isolate STMS 220 from the pump drive system 218; thus, in the depicted embodiment of FIG. 2, the pump body 211 and pump drive system 218 are coupled to one another by a thermal isolation plate 216 which is configured to thermally isolate the two components. In one embodiment, the thermal isolation plate 216 is of a material having insulating properties, i.e., Additionally, thermal isolation plate 216 may also be utilized as a mechanical guide for pump piston 212 and thus is preferably made from a material possessing low thermal conductivity (i.e., a material having a thermal conductivity at 10° C. mean temperature (W/m·K) less than approximately 3.5), low friction, and high wear resistance such as PEEK.

In an alternate embodiment of the STMS 220, the heating element 221 may be directly in contact with fluid within the pump 210, wherein the heating element 221 transfers energy to the fluid without utilization of an intermediary medium such as pump body 211. Alternate operable equivalent heating methodologies may also be employed such as inductive heating of the pump body 211 wherein fluid contained within is heated.

In the present invention, the SFMS 210 and the STMS 220 are contiguous whereby solution within the SFMS 210 is heated by the STMS 220 to the desired temperature prior to dispensing, with no additional solvent entering the SFMS 210 during dispensing and/or beverage brewing. Benefits of this configuration are found in the ability to maintain dispensed solvent temperature regardless of the flow rate or volume dispensed. Further benefits of combining the SFMS 210 and the STMS 220 are found in a reduction of overall size and number of components required to form a brewing system.

Figure 9:
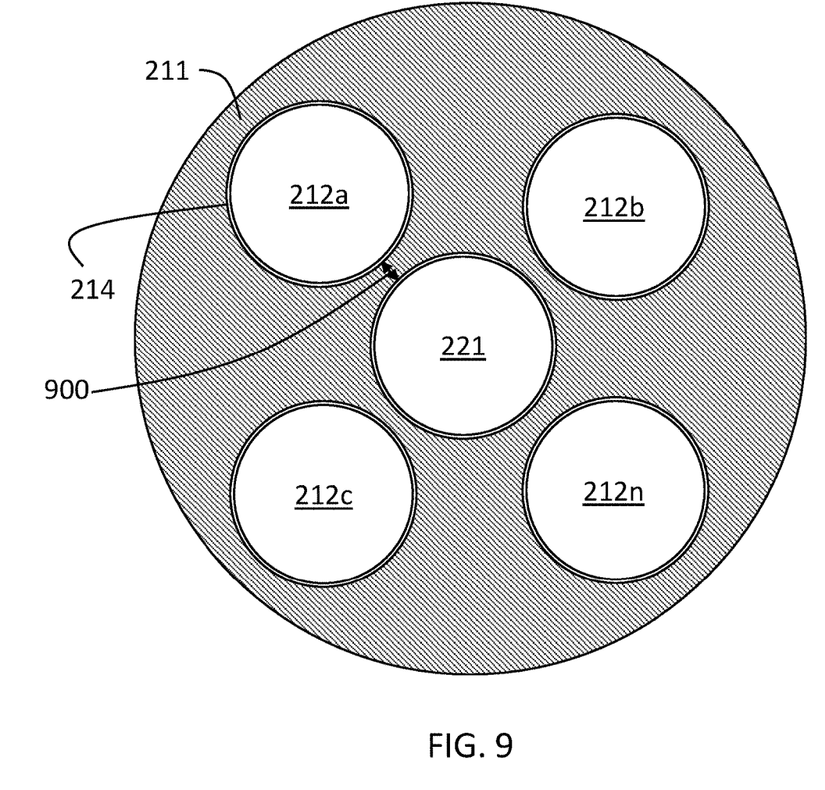
FIG. 9 is a cross-sectional view of an exemplary pumping body used with the brewing device of FIG. 1 in accordance with one embodiment of the present invention.

The rate of solvent heating and thermal stabilization will be greatly affected by the contact area between the pump body 211 and solvent. Therefore it will be found advantageous to maximize the contact area with respect to walls of the pump bore 214 heated by the heating element 221 and the solvent contained in the internal volume 215. A methodology of achieving effective and efficient heating of the solvent is to increase the number of pistons utilized to pump the same volume of solvent as depicted in FIG. 9. FIG. 9 depicts an exemplary pump body 211 with four pump bores 212 defining internal pumping cavities where pistons 212$a$-$n$ are disposed therein and where introduced solvent is heated by the heating element 221 via conduction through the heat body 211. As such, it is beneficial when using a plurality of pistons 212$a$-$n$ to make sure the pistons 212$a$-$n$ flank the heating element 221. Said differently, the heating element 221 should be interposed between the pistons 212$a$-$n$, where "a" represents a first piston and where "n" represents any additional number of pistons 212.

The rate of heating the solvent will be affected by the thermal conductivity of pump body 211 and the length or amount of material (represented with arrow 900) separating the heating element 221 and the piston bores 214. Thus, the pump body 211 is ideally made from a material with high thermal conductivity, such as copper, brass, or aluminum, and has a length 900 less than approximately 2". As will be obvious to those of skill in the art, the requisite precautions for corrosion and surface wear prevention should also be taken into account, in addition to employing a heat insulating sheathing over the body 211 to limit heat exposure to other internal components of the device 100 and provide a more effective fluid heating process.

In an alternate embodiment, not shown, the solvent temperature may be dynamically modulated through the selective combination of two pump systems, each composed of a SFMS 210 and a STMS 220, that discharge solvent at differing temperatures. The two solvents are then selectively combined that then supplies the single brew chamber 230. In this embodiment, during an infusion, the control system 250 will pump each fluid at the appropriate rate whereby their mixture achieves the desired temperature, flow rate and total volume of the solvent for the infusion. Such a system also enables the user to dynamically increase and decrease the temperature during an infusion. In such an embodiment, it may be found advantageous to thermally isolate the two SFMS pump systems whereby their STMS may operate independently. Furthermore, it may be found advantageous to thermally isolate the brew chamber 230 whereby it is thermodynamically uninfluenced by the STMS of either pumping systems.

Brew Chamber

Referring to FIGS. 2-3, the brew chamber 230 may be formed by two separable components of the pump body 211 and the brew chamber housing 233. The pump body 211 and the brew chamber housing 233 may be connected by a housing lock mechanism 231, whereby the removal and insertion of solute 235 contained therein may be readily facilitated. The brew chamber housing 233 selectively contains a solute 235 within a filter 234 which is sealingly engaged with the pump body 211 via a gasket 236. A solution diffuser screen 232 may also be included to prevent the migration of the solute 235 from brew chamber 230 and/or for uniform distribution of solvent 313 within the chamber 230.

In another embodiment of the present invention, the brew chamber 230 is in fluidic connection but not contiguous and/or partially formed by the pump body 211 such that it is not in direct thermodynamic connection with STMS 220. In such an embodiment, it may be found advantageous to incorporate another temperature sensor into the brew chamber 230 so the solvent temperature may be selectively modified.

SPMS

The SPMS 240 may be composed of an infusion pressure sensor 242 and a flow regulator 241 both in fluid communication with the internal pump volume 215 when the device is in operation. Further, the infusion pressure sensor 242 and the flow regulator 241 may also be communicatively coupled with control system 250 for modifying the solvent properties and the infusion process parameters.

The brewing chamber 250 is in fluid communication with the SPMS 240 that selectively modulates infusion pressure via the addition of flow resistance generated by at least one pressure regulation component, e.g., a valve 241. As the filter 234 and the solute 235 may create a resistance to flow, a pressure monitoring device 242 disposed within the conduit 301 so as to be in fluid communication with the solvent upstream of the brewing chamber 230 to enable accurate infusion pressure measurement. In order to increase infusion pressure (i.e., infusion process pressure) greater than that provided by solute 235 and filter 234, the valve 241 may be selectively activated to increase infused solution 311 flow resistance thereby increasing infusion pressure. Once activated, the valve 241 may be selectively deactivated, decreasing flow resistance and thus infusion pressure.

As will be understood by those skilled in the art, in order to control the infusion pressure in accordance with the present invention, the valve 241 is of a class that is not activated based on a defined or determined pressure differential across the valve 241, e.g., blowoff valve. Said another way, the valve 241 is such that the flow of the solvent through the solute is not contingent on a pressure differential across the pressure regulation component. Rather, it is activated or utilized to dictate the infusion pressure independent of pressure differential across itself. As such, the one or more pressure regulation component 241 is operably unaffected by a pressure differential across itself during the infusion process. Any other known infusion systems that may utilize a valve downstream, are solely utilizing this valve 241 as a means to relieve pressure in the lines, thereby are always operably affected by a pressure differential across itself. Therefore, the present invention provides a user the advantage of dictating the infusion pressure independent of releasing the infused solution and controlling other system parameters.

In one embodiment, the pressure regulation component, e.g., valve 241, may be a needle valve. In other embodiments, the valve 241 may include a butterfly valve, a globe valve, a pinch valve, or any other flow impeding device capable of regulating pressure within brewing chamber 230. Ideal valves are impervious to particulate matter, oils, and other dissolved solids that may exist in infused solution, possess a minimal internal volume, are readily cleaned, and possess a minimal thermal conductivity and specific heat capacity. In practice, the pressure monitoring device 242 is used to monitor the infusion pressure, which, in turn, modulates the valve 241 to adjust infusion pressure. The SPMS 240 may be connected to a control system 250 which may modulate the valve 241 based on inputs from the pressure monitoring device 242 to achieve a desired infusion pressure.

Exemplary valve 241 include pressure regulators, needle, butterfly, globe and pinch valves or any other flow regulating device capable of regulating pressure within brew chamber. Ideal valves are impervious to particulate matter, oils, and other dissolved solids that may exist in infused solution. Furthermore, the SPMS optimally contains a minimal internal volume and adjusts pressure within the chamber to an accuracy of at least +/−0.5 Bar and a minimum rate of pressure change greater than 1 Bar/sec. Additionally the internal volume should be readily cleaned.

Control System

Figure 10:
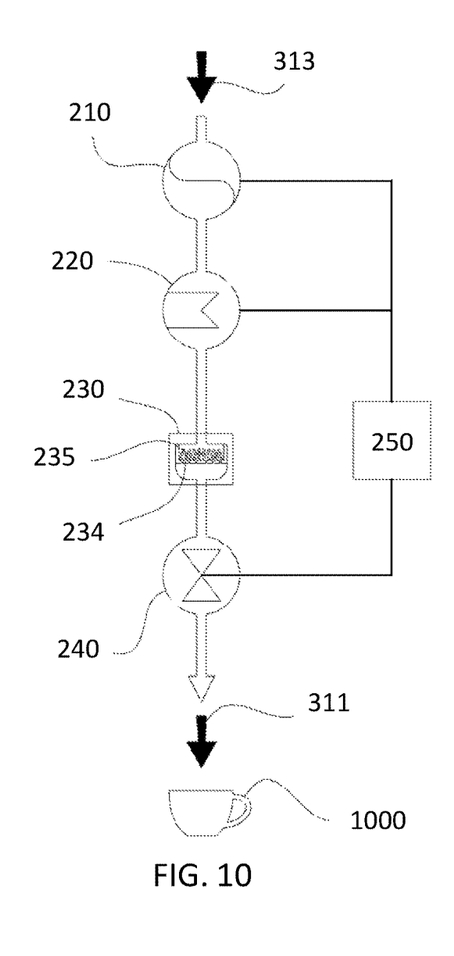
FIG. 10 is a schematic diagram depicting a fluid flow through the beverage brewing device of FIG. 1 in accordance with one embodiment of the present invention.

With reference now to FIG. 10, a schematic diagram of exemplary components used in the brewing device 100 is shown. The SFMS 210, the STMS 220, and the SPMS 240 can all be seen communicatively coupled to the electronic control 250 system through wires or wirelessly. The electronic control system 250 is used to independently and automatically modify flow rate, temperature, and pressure of the infusion. The control system 250 modifies flow rate of solvents by accordingly adjusting the SFMS 210. Additionally, the control system 250 modulates the solvent temperature through modulation of STMS 220. Furthermore, the control system 250 adjusts pressure of the infusion by adjusting SPMS 240. For example, during an infusion process, the control system 250 may selectively modify one or more of the aforementioned infusion parameters in accordance with user's desires. This modification may be utilized to modify chemicals and/or dissolved solids infused into the resulting solution producing a preferred beverage by the user or a consumer. The parameters required to produce said preferred beverage may be stored as programs or brewing formulas in control system 250 and recalled as desired to reproduce and replicate the preferred beverage formula. As such, the infused beverage formulate may be any recipe or formulation made up of infusion process parameters.

The electronic control system 250 is ideally used to selectively modulate and monitor performance of the SFMS, the STMS, and the SPMS during the infusion process. Additionally, the control system 250 is able to be preprogrammed with brewing "formulas" that may be tailored to different personal preferences and solute. These formulas may be recalled when desired thus minimizing the amount of labor, skill and time required to reproduce brewing results. The control system 250 may also include networking capabilities such as being connected to the Internet, thereby enabling remote system monitoring and transmission of brewing "formulas" to the brewing system. Preferably, the said control system 250 will be capable of processing a multitude of user imputed variables to create an executable extraction. Said variables include pressure, flow rate, temperature, overall time, and dispensed volume. The control system 250 may also be operably configured to move the infusion vent valve 307 from the open state to the closed state, and vice versa.

As will be obvious to those skilled in the art, the variables of flow rate, infusion time and dispensed infusion volume are not all independent variables, thus, the control system 250 is preferably capable of affording the user the ability to select the two independent variables desired. For instance, the user may elect to dictate infusion flow rate with respect to infusion time thus making dispensed volume the dependent variable. Alternately, the user may elect to dictate dispensed volume with respect to time making flow rate a dependent variable determined by the control system 250.

Furthermore, the said control system 250 is preferably capable of enabling the user to dynamically (i.e., during the brewing process) modify all the brew variables with respect to the other variables. For instance, the user may decide to dictate the variable of temperature with respect to pressure, time, or volume. Likewise, the pressure may be dictated with respect to time or volume or temperature. However, for the sake of simplicity, it is preferable for all the variables to be dictated with respect to the same parameter of either time or dispensed volume with absolute limits and rates of change governed by the capabilities of the STMS, SFMS, brew chamber, and SPMS. In the event that the feedback mechanisms indicate that the actual infusion deviated from any of the set values of the brew formula, an error message is preferably generated communicating the error to the user whereby the user may modify the brew formula or modify solute and or filter media to enable the brewing system to successfully execute the brew formula.

In the event that a brew formula is generated for a set volume and the user desires to increase the volume of solution brewed while maintaining the effective brew parameters, the control system 250 is preferably capable of taking the original brew formula and modulating the dispensed flow rate in a temporary fashion thus, keeping total time constant, and also recommending an increase in filter media size to ensure the increased infusion volume is of consistent flavor with the original brew formula.

In addition to the benefit of Benefits of the aforementioned system may be derived from inclusion of less than all three dynamically adjustable solution control systems: SFMS 210, STMS 220 and SPMS 240. For instance a beverage brewing system 100 may include a STMS 220 and SFMS 210 or an alternate configuration may include a SFMS 210 and SPMS 240 operably connected to a brewing chamber 230. Alternately benefits will also be found from the inclusion of one dynamically adjustable system such as SFMS 210 whereby infusion temperature is held at a constant set point by the STMS 220 and infusion pressure is a function of solvent flow rate and resistance provided by the solute and filter media rather than controlled by a SPMS 210.

While the disclosed beverage brewing/infusion system 100 mitigates the impact effect variances in solute size and solute compaction have on the infusion flavor, it may be found useful to utilize data recorded by the control system 250 to modify solute parameters such as solute size or solute compaction. The may be accomplished through a solute modification system, which may include a solute grinder and/or compaction tool operably connected with the brewing chamber 230 where the solute is disposed. In one exemplary system, a control system 250, as described above, is communicatively coupled to a solute modification system, specifically a solute grinder, whereby sensor data from an infusion process may be utilized to modify performance of said grinder to improve the performance of the total system. One such example is utilizing pressure sensor data during an infusion process to modify the performance of a grinder to produce smaller or larger solute in order to ensure a consistent beverage flavor.

For instance, if a beverage is brewed/infused utilizing a formula and the SPMS 240 is unable to produce the pressure profile specified by the formula or SPMS 240 requires excessive or inordinate levels of flow modulation, the control system 250 may communicate with a solute grinder causing it to reduce or increase or decrease the size of solute disposed within the brew chamber. As will be obvious, assuming the same level of solute compaction and solute mass, a decrease in average solute particle size will result in higher solute resistance and an increase in average solute particle size will result in decreased resistance enabling lower infusion pressures. Likewise, the system may be configured to utilize control system data to modify solute compaction rather than average solute particle size.

The invention claimed is:

1. A system for creating infused beverages comprising:
a solvent flow management system having a pump housed in a pump body and operably coupled to a pump drive system operably configured to drive the pump to induce a flow of a solvent, housed by the pump, through a solute housed in a brewing chamber to generate an infused solution, the brewing chamber and the pump fluidly coupled through a solvent-flow conduit;
a solvent temperature management system having a heating element disposed within the pump body and outside of fluid contact with the solvent, the heating element operably configured to activate and thermally couple with the solvent housed by the pump through conduction within a material of the pump body; and
an electronic control system communicatively coupled to the solvent flow management system and the solvent temperature management system, the electronic control system operably configured to activate the pump drive system and to activate the heating element.

2. The system according to claim 1, wherein:
the pump is of a piston-driven pump assembly that includes the pump body having a pump bore defining a pump interior volume, the pump interior volume having a piston disposed therein that is both in a fluidically sealed configuration with the pump bore and operably configured to translate from a first position to a second position along a piston translation path, wherein the second position of the piston results in a reduced volumetric capacity of the pump interior volume than a volumetric capacity of the pump interior volume when the piston is in the first position.

3. The system according to claim 2, wherein the pump drive system further comprises:
a motor operably coupled to the piston and communicatively coupled to the electronic control system, the electronic control system operably configured to modulate the motor in defined increments.

4. The system according to claim 2, wherein:
the electronic control system is operably configured to initiate a brewing cycle generating the infused solution by flow of the solvent through the solute in the brewing chamber through at least one single translation of the piston along the piston translation path into the second position.

5. The system according to claim 4, wherein:
the outflow valve is of a one-way check valve.

6. The system according to claim 4, wherein:
the outflow valve is of a selective-flow valve that is communicatively coupled to the electronic control system and operably configured to selectively control a directional flow of the solvent.

7. The system according to claim 1, further comprising:
a brew chamber-vent conduit, independent of the solvent-flow conduit, spanning from and in fluid communication with the brewing chamber; and
a vent valve disposed in the brew chamber-vent conduit and operably configured to place the brewing chamber in fluid communication with an outside ambient environment.

8. The system according to claim 1, wherein:
the electronic control system is operably configured to dynamically activate at least one of the pump drive system and the heating element based on a solvent property sensed by at least one of a temperature sensor and a pressure sensor.

9. The system according to claim 1, further comprising:
a solvent pressure management system having a flow regulator downstream of the brewing chamber, the flow regulator operably configured to selectively modify an infusion process pressure greater than a pressure created upstream in the brewing chamber caused by a flow of the solvent through the solute.

10. A device for creating infused beverages comprising:
a solvent flow management system having:
a pump body with a pump bore defining a pump interior volume;
a piston disposed within the pump interior volume and in a fluidically sealed configuration with the pump bore;
a pump drive system operably configured to translate the piston from a first position to a second position along a piston translation path, wherein the second position of the piston results in a reduced volumetric capacity of the pump interior volume than a volumetric capacity of the pump interior volume when the piston is in the first position wherein the volumetric capacity differential is equal to the desired dispensed fluid volume;
a pump-valve conduit downstream of the pump interior volume and in fluid communication with a brewing chamber for housing a solute;
an electronic control system communicatively coupled to the solvent flow management system and operably configured to initiate a brewing cycle generating an infused solution, by flow of the solvent through the solute in the brewing chamber, through a single translation of the piston along the piston translation path into the second position; and
an outlet downstream of the brewing chamber for discharging the infused solution.

11. The device for creating infused beverages according to claim 10, wherein the pump drive system further comprises:
a motor operably coupled to the piston and communicatively coupled to the electronic control system, the electronic control system operably configured to modulate the motor in defined increments.

12. The device for creating infused beverages according to claim 10, further comprising:
an inflow valve operably configured to introduce a solvent within the pump interior; and
an outflow valve disposed in a conduit separating the brewing chamber and the pump interior volume, the outflow valve operably configured to control the flow of solvent into the brewing chamber.

13. The device for creating infused beverages according to claim 10, wherein:
no solvent is introduced into the pump interior volume after initiating solvent dispensing.

14. The device for creating infused beverages according to claim 13, further comprising:
a solvent temperature management system having a heating element disposed within the pump body, wherein the heating element is disposed outside of fluid contact with the solvent and is operably configured to increase the temperature of the solvent housed in the pump interior volume through conduction within the pump body.

15. The device for creating infused beverages according to claim 14, wherein:
the brewing chamber is at least partially formed by the pump body and in thermodynamic connection with the heating element, the pump body of a material with a high thermal conductivity.

16. The device for creating infused beverages according to claim 14, wherein the pump body further comprises:
a plurality of pump bores each defining a pump interior volume with a piston disposed therein and in a fluidically sealed configuration with the pump bore, the plurality of pump bores flanking the heating element.

17. The device for creating infused beverages according to claim 10, wherein:
the second position of the piston results in a solvent displacement volume that is substantially equal to the desired dispensed solvent through a single translation of the piston along the piston translation path into the second position.

18. The device for creating infused beverages according to claim 9, wherein the solvent flow management system further comprises:
a thermal isolation plate separating the pump body and the pump drive system, the thermal isolation plate is of a thermally insulating material different than a material of both the pump body and the pump drive system to which the thermal isolation plate couples.

19. A system for creating infused beverages comprising:
a solvent flow management system having a pump body with a pump bore defining a pump interior volume with a piston disposed therein that is operably coupled to a pump drive system operably configured to translate the piston to generate a solvent displacement volume that induces a flow of solvent through a solute housed in a brewing chamber to generate an infused solution , the brewing chamber and the pump interior volume fluidly coupled through a solvent-flow conduit;
a solvent temperature management system having a heating element disposed within the pump body, the heating element operably configured to activate and thermally couple with the solvent housed in the pump interior volume; and
an electronic control system communicatively coupled to the solvent flow management system and the solvent temperature management system, the electronic control system operably configured to initiate a brewing cycle generating the infused solution of the infused solution volume without any solvent introduced into the pump interior after initiating of the brewing cycle.

20. A system for creating infused beverages comprising:
a solvent flow management system having a pump housed in a pump body and operably coupled to a pump drive system operably configured to drive the pump to induce a flow of a solvent, housed by the pump, through a solute housed in a brewing chamber to generate an infused solution, the brewing chamber and the pump fluidly coupled through a solvent-flow conduit;
a solvent temperature management system having a heating element disposed within the pump body and outside of fluid contact with the solvent, the heating element operably configured to activate and thermally couple with the solvent housed by the pump through conduction within a material of the pump body; and
an electronic controller communicatively coupled to the solvent flow management system and the solvent temperature management system, the electronic controller operably configured to activate the pump drive system and to activate the heating element.

* * * * *